(12) United States Patent
Ogino

(10) Patent No.: US 7,965,348 B2
(45) Date of Patent: Jun. 21, 2011

(54) LIQUID CRYSTAL MODULE

(75) Inventor: Yuki Ogino, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 172 days.

(21) Appl. No.: 12/207,405

(22) Filed: Sep. 9, 2008

(65) Prior Publication Data

US 2009/0079898 A1  Mar. 26, 2009

(30) Foreign Application Priority Data

Sep. 21, 2007  (JP) .................................. 2007-244890

(51) Int. Cl.
*G02F 1/1335* (2006.01)
(52) U.S. Cl. ........................................... 349/58; 349/59
(58) Field of Classification Search .................. 349/58, 349/59
See application file for complete search history.

(56) References Cited

U.S. PATENT DOCUMENTS

| | | | |
|---|---|---|---|
| 7,090,387 B2 * | 8/2006 | Kohno | 362/561 |
| 7,489,371 B2 * | 2/2009 | Yamamoto et al. | 349/58 |
| 2005/0047173 A1 * | 3/2005 | Kohno | 362/561 |
| 2005/0286002 A1 | 12/2005 | Tajima | |
| 2006/0170839 A1 * | 8/2006 | Yamamoto et al. | 349/58 |
| 2006/0209228 A1 * | 9/2006 | Nishida | 349/59 |
| 2007/0268444 A1 * | 11/2007 | Azuma et al. | 349/150 |

FOREIGN PATENT DOCUMENTS

| | | | |
|---|---|---|---|
| JP | 57-161289 U | | 10/1982 |
| JP | H1-174980 | * | 10/1982 |
| JP | 1-174980 U | | 12/1989 |
| JP | S57-161289 | * | 12/1989 |

* cited by examiner

Primary Examiner — K. Cyrus Kianni
(74) Attorney, Agent, or Firm — Global IP Counselors

(57) ABSTRACT

A liquid crystal module includes a liquid crystal panel, a printed wiring board, a rear frame, a plurality of protrusion portions and first and second positioning portions. The rear frame supports the liquid crystal panel. The protrusion portions protrude from a rear face of the rear frame and fixedly support the printed wiring board on upper faces of the protrusion portions. The first and second positioning portions further protrude from at least one of the protrusion portions. The first positioning portion positions the printed wiring board in a first direction. The second positioning portion positions the printed wiring board in a second direction perpendicular to the first direction.

10 Claims, 5 Drawing Sheets

LIQUID CRYSTAL MODULE

CROSS-REFERENCE TO RELATED APPLICATIONS

This application claims priority to Japanese Patent Application No. 2007-244890 filed on Sep. 21, 2007. The entire disclosure of Japanese Patent Application No. 2007-244890 is hereby incorporated herein by reference.

BACKGROUND OF THE INVENTION

1. Field of the Invention

The present invention generally relates to a liquid crystal module. More specifically, the present invention relates to a liquid crystal module having a printed wiring board attached to a rear frame.

2. Background Information

A conventional liquid crystal module is installed into a television set or a personal computer. The liquid crystal module includes a rear frame and a main printed wiring board. The rear frame includes a plurality of support protuberances. The main printed wiring board is supported on the support protuberances and fixed with screws. The printed wiring board is positioned before the printed wiring board is fixed with the screws. The positioning is accomplished by pressing end faces of the printed wiring board against a plurality of lift-up positioning tabs formed separate from the support protuberances.

With a conventional printed wiring board attachment apparatus, a trapezoidal seat is formed by cutting and lifting up a bottom face of a chassis made of sheet metal. A printed wiring board is positioned by fitting a notch formed in the printed wiring board to a guide tab that sticks up from the trapezoidal seat. Then, the printed wiring board is fixed to the trapezoidal seat with a screw (see Japanese Laid-Open Utility Model Publication No. H1-174980, for example).

With another conventional printed wiring board attachment structure, several protrusions with an inverted L shape are provided to sheet metal by cutting and lifting. Edges of a printed wiring board are fixed to the protrusions. A step portion for positioning the printed wiring board is provided to a horizontal part of the protrusion. An end edge of the printed wiring board is mated with the step portion (see Japanese Laid-Open Utility Model Publication No. S57-161289, for example).

When the printed wiring board is positioned by forming the lift-up positioning tabs in the rear frame as with the conventional liquid crystal module, light leaks to the back of the liquid crystal module through openings formed in portions of the rear frame 1 where the lift-up tabs are formed. Also, since the lift-up tabs are prone to deformation, it is difficult to position the printed wiring board accurately.

Even when the printed wiring board attachment technique of Japanese Laid-Open Utility Model Publication No. H1-174980 is applied to a liquid crystal module, light also leaks out through openings formed in the portions where the trapezoidal seat is formed by cutting and lifting. Also, even if the printed wiring board attachment technique of Japanese Laid-Open Utility Model Publication No. S57-161289 is applied, light also leaks out through openings formed in the portions where the inverted L-shaped protrusions are formed by cutting and lifting.

In view of the above, it will be apparent to those skilled in the art from these disclosures that there exists a need for an improved liquid crystal module. This invention addresses this need in the art as well as other needs, which will become apparent to those skilled in the art from these disclosures.

SUMMARY OF THE INVENTION

The present invention is conceived in light of the above-mentioned problems. One object of the present invention is to provide a liquid crystal module with which a printed wiring board is accurately positioned to a rear frame.

In accordance with one aspect of the present invention, a liquid crystal module includes a liquid crystal panel, a printed wiring board, a rear frame, a plurality of protrusion portions and first and second positioning portions. The rear frame supports the liquid crystal panel. The protrusion portions protrude from a rear face of the rear frame and fixedly support the printed wiring board on upper faces of the protrusion portions. The first and second positioning portions further protrude from at least one of the protrusion portions. The first positioning portion positions the printed wiring board in a first direction. The second positioning portion positions the printed wiring board in a second direction perpendicular to the first direction.

With the liquid crystal module of the present invention, it is possible to provide a liquid crystal module with which a printed wiring board is accurately positioned to a rear frame.

These and other objects, features, aspects and advantages of the present invention will become apparent to those skilled in the art from the following detailed descriptions, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENT

Selected embodiments of the present invention will now be explained with reference to the drawings. It will be apparent to those skilled in the art from these disclosures that the following descriptions of the selected embodiments of the present invention are provided for illustration only and not for the purpose of limiting the invention as defined by the appended claims and their equivalents.

First Embodiment

Figure 1:
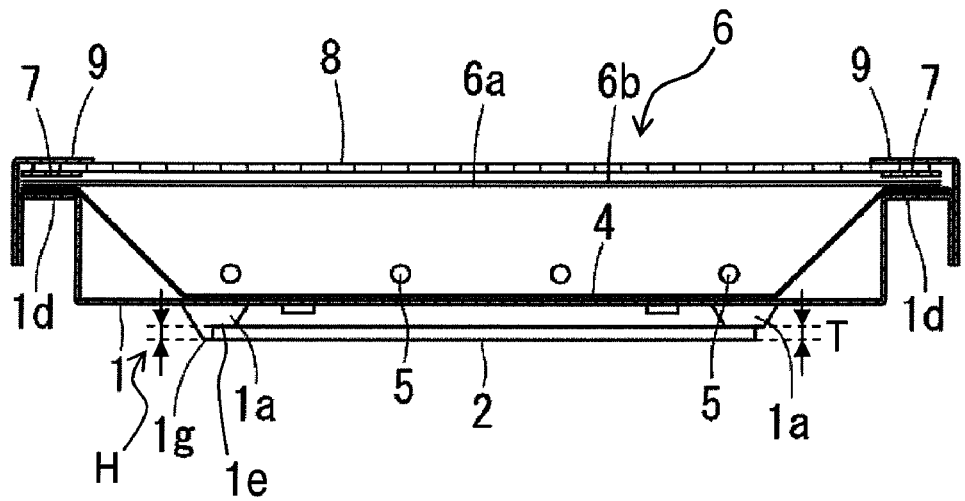
FIG. 1 is a simplified lateral cross sectional view of a liquid crystal module in accordance with a first embodiment of the present invention.
Figure 2:
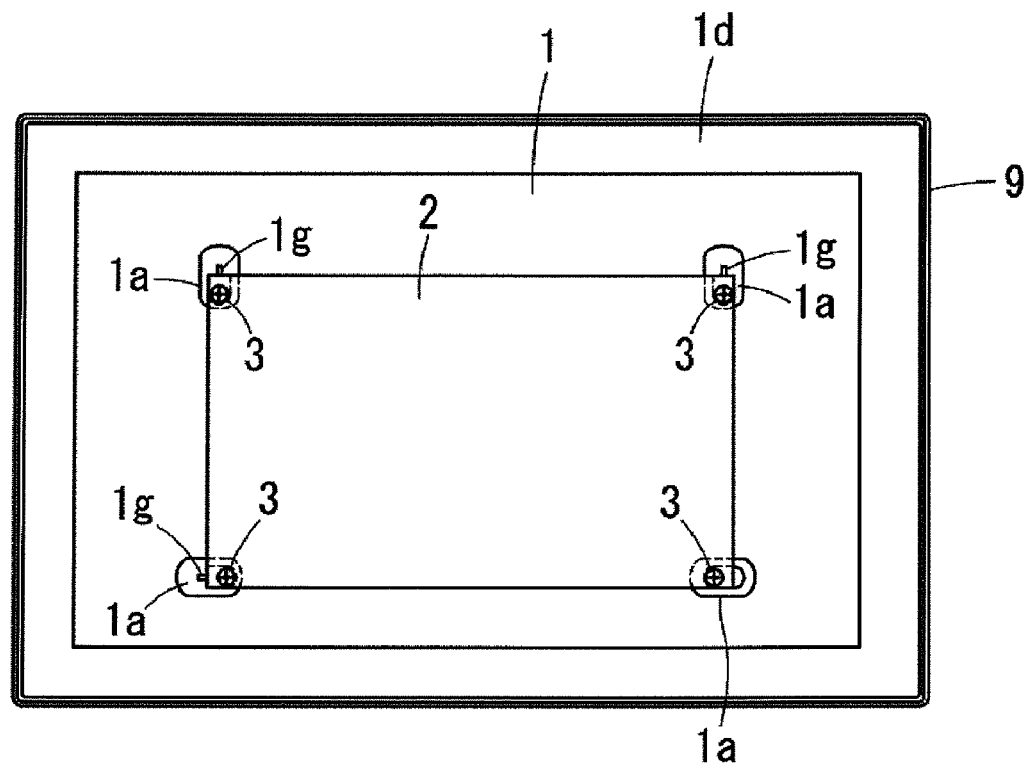
FIG. 2 is a rear elevational view of the liquid crystal module.
Figure 3:
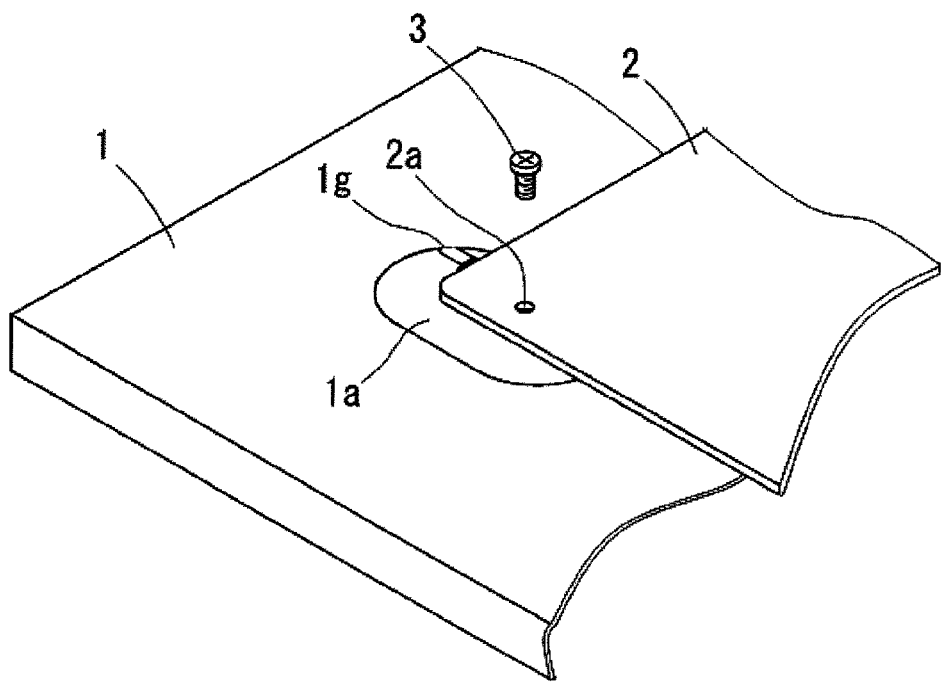
FIG. 3 is a partial exploded perspective view illustrating a rear side of the liquid crystal module.

As shown in FIG. 1, a liquid crystal module includes a rear frame 1, a main printing wiring board 2, a light reflecting sheet 4, a plurality of cold cathode tubes 5, an optical sheet 6, a pair of L-shaped plastic frames 7, a liquid crystal panel (liquid crystal cell) 8 and a bezel 9. The rear frame 1 is formed in a flattened box shape. The rear frame 1 is made of sheet metal. The printing wiring board 2 is attached to a rear side of the rear frame 1. The light reflecting sheet 4 is formed into an inverted trapezoidal shape by bending. The light reflecting sheet 4 is provided in an interior of the rear frame 1. The cold cathode tubes 5 are bent in a U shape. The cold cathode tubes 5 are disposed over the light reflecting sheet 4. The cold cathode tubes 5 emit light to illuminate the liquid crystal panel 8. The optical sheet 6 includes a light diffusing sheet 6a and a light diffusing film 6b. The light diffusing sheet 6a and the light diffusing film 6b are disposed one over the other above the cold cathode tubes 5. Peripheral edges of the optical sheet 6 are pressed against outer peripheral flanges 1d of the rear frame 1 by the L-shaped plastic frames 7. The liquid crystal panel 8 is placed over the plastic frames 7. Peripheral edges of the liquid crystal panel 8 are fixed from above by the bezel 9. As shown in FIGS. 1-3, a plurality of (four in FIG. 2) support protuberances (e.g., protrusion portions) 1a are integrally formed on the rear frame 1. Specifically, the support protuberances 1a and the rear frame 1 are integrally formed as a one-piece unitary member. The support protuberances 1a support the printing wiring board 2. Specifically, four corners of the printing wiring board 2 are supported by the support protuberances 1a and thereby attached to the rear side of the rear frame 1.

The support protuberances 1a are formed by drawing the sheet metal of the rear frame 1 (draw-forming). Specifically, the support protuberances 1a protrude from a rear face of the rear frame 1. Each of the support protuberances 1a has a slant side surface (e.g., side face) having a continuous periphery. Thus, light leakage through the support protuberances 1a is prevented. Specifically, the slant side surfaces of the support protuberances 1a prevent the light emitted by the cold cathode tube 5 from leaking between the rear frame 1 and the printed wiring board 2.

Figure 4:
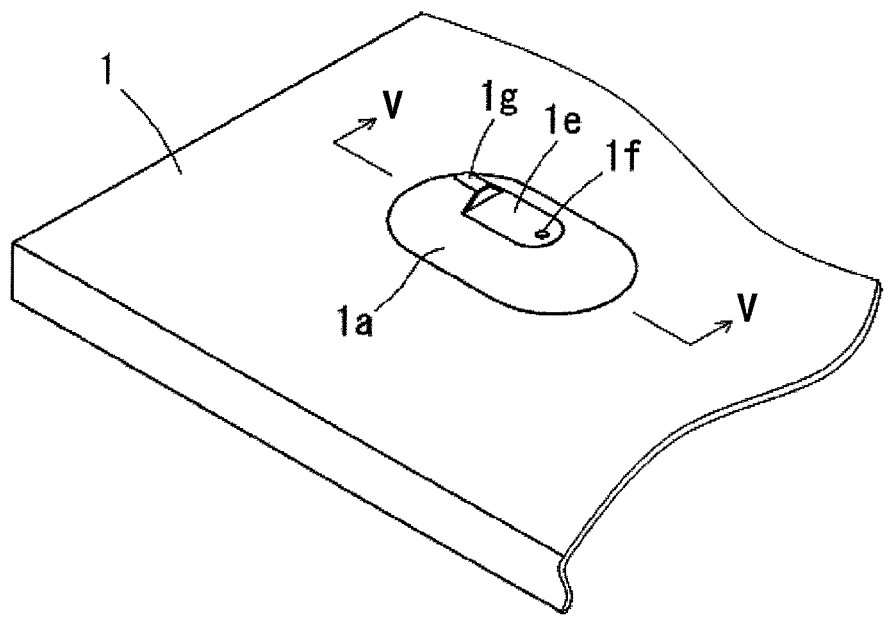
FIG. 4 is a partial perspective view illustrating a rear side of a rear frame of the liquid crystal module.
Figure 5:
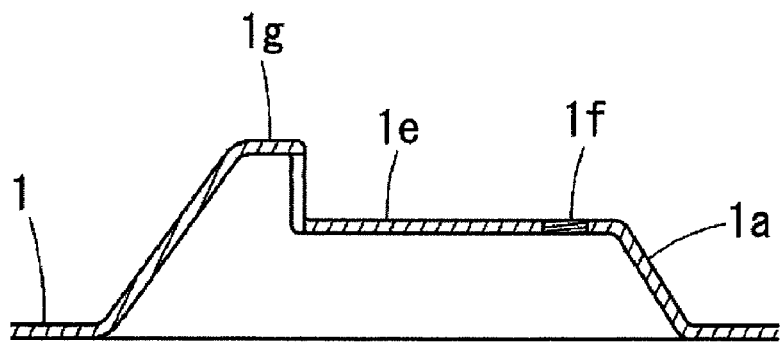
FIG. 5 is a detail cross sectional view of the rear frame taken along line V-V shown in FIG. 4.
Figure 6:
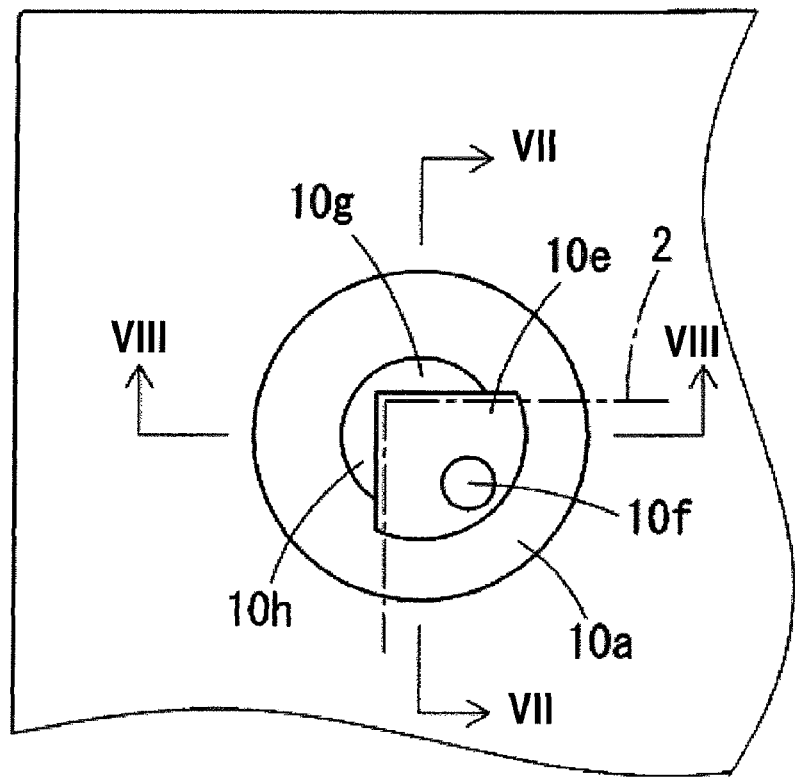
FIG. 6 is a partial rear elevational view of a rear frame of a liquid crystal module in accordance with a second embodiment of the present invention.
Figure 7:
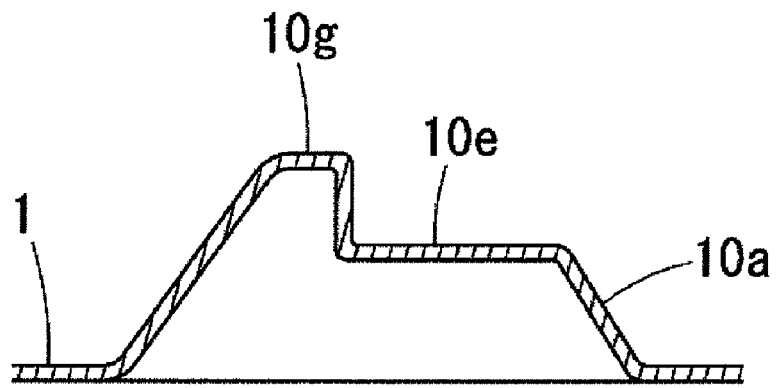
FIG. 7 is a detail cross sectional view of the rear frame taken along line VII-VII shown in FIG. 6.
Figure 8:
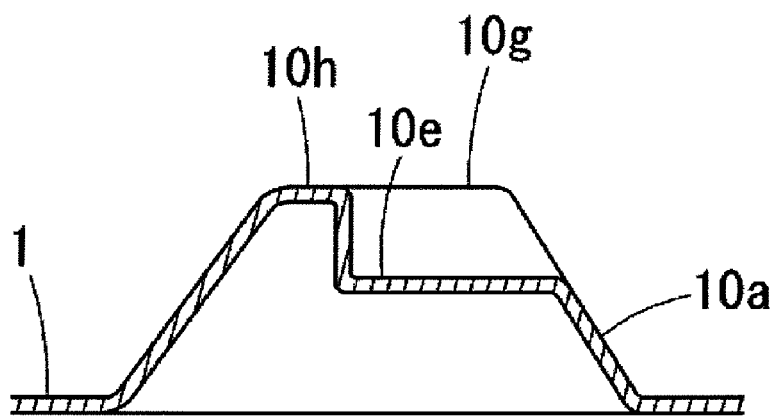
FIG. 8 is a detail cross sectional view of the rear frame taken along line VIII-VIII shown in FIG. 6.

As shown in FIGS. 4 and 5, the support protuberances 1a have an oval shape in plan view. Upper faces 1e at the top of the support protuberances 1a are formed in flat faces so that the printing wiring board 2 can be supported stably. The upper faces 1e of the support protuberances 1a have same height with respect to the rear frame 1. A screw hole 1f is formed at one end of each of the upper faces 1e. A screw 3 is threaded into the screw hole 1f for fixing the printed wiring board 2. A small protrusion 1g is integrally formed with the support protuberance 1a by drawing at the other end of the upper face 1e. Specifically, the small protrusion 1g and the support protuberance 1a are integrally formed as a one-piece unitary member. The small protrusion 1g has a substantially triangular peaked shape for positioning the printing wiring board 2. The small protrusions 1g are drawn integrally with the support protuberances 1a. The small protrusions 1g have far higher strength than lift-up tabs formed in a conventional frame by cutting, and are much more resistant to deformation. Thus, an end face of the corner of the printing wiring board 2 can be firmly pressed against the small protrusion 1g as shown in FIG. 3. As a result, the printing wiring board 2 can be positioned accurately.

The small protrusions 1g are formed taller than the upper faces 1e of the support protuberances 1a by at least the thickness of the printing wiring board 2. Specifically, the height H of the small protrusion 1g from the upper face 1e to the top of the small protrusion 1g is greater than or equal to the thickness T of the printing wiring board 2. Thus, when the printing wiring board 2 is being positioned, the end face of the corner of the printing wiring board 2 is prevented from readily slipping away from the small protrusions 1g. However, the small protrusions 1g will get in the way if the small protrusions 1g are too tall, so the height H of the small protrusion 1g is preferably no more than slightly greater than the thickness T of the printing wiring board 2.

In order to facilitate drawing, the drawing involves making a cut at the boundary between the small protrusions 1g and the upper faces 1e of the support protuberances 1a. Thus, rising faces (first and second positioning faces) of the small protrusions 1g are open to the upper faces 1e. The openings formed at the rising faces of the small protrusions 1g are small and the height H of the small protrusion 1g is no more than slightly greater than the thickness T of the printing wiring board 2. Thus, there is almost no light leakage. However, the drawing can be performed without making a cut. In other words, the drawing is preferably performed so that no openings are formed. In this case, no opening is formed at the rising faces of the small protrusions 1g. As a result, the light leakage through the openings are completely eliminated.

As shown in FIG. 2, of the four support protuberances 1a formed on the rear frame 1, the small protrusions 1g are integrally formed on three of the support protuberances 1a, namely, the upper right, upper left, and lower left ones. The upper right and upper left support protuberances 1a are formed so that the major axis of the oval shape of the upper right and upper left support protuberances 1a are parallel to a vertical direction of the rear frame 1. The small protrusions 1g are located vertically upward with respect to the upper faces 1e and face vertically downward. In other words, the rising faces of the small protrusions 1g face vertically downward and abuts the printing wiring board 2. As a result, the small protrusions 1g position the printing wiring board 2 in the vertical direction of the rear frame 1. The lower left support protuberance 1a is formed so that the major axis of the oval shape of the lower left support protuberance 1a is parallel to a horizontal direction of the rear frame 1. The small protrusion 1g are located left side with respect to the upper face 1e and faces right. In other words, the rising face of the small protrusion 1g faces right and abuts the printing wiring board 2. As a result, the small protrusion 1g positions the printing wiring board 2 in the leftward direction. Therefore, as shown in FIG. 2, when the upper right and upper left corners of the printing wiring board 2 are placed on the upper right and upper left support protuberances 1a and pressed against the small protrusions 1g thereof, and the lower left corner of the printing wiring board 2 is placed on the lower left support protuberance 1a and pressed against the small protrusion 1g thereof, the printing wiring board 2 is accurately positioned without being skewed. Since the printing wiring board 2 can be positioned by the small protrusions 1g formed at three of the support protuberances 1a (the upper right, upper left, and lower left ones), no small protrusion is formed on the lower right support protuberance 1a.

As long as the small protrusions 1g are formed on two of the four support protuberances 1a, such as on the upper right and lower left support protuberances 1a, or on the upper left and lower left support protuberances 1a, it is possible to position the printing wiring board 2 in two directions (vertically upward and to the left). However, it is preferable to form the small protrusions 1g on three of the support protuberances 1a as mentioned above. In this case, the three support protuberances 1a on which the small protrusions 1g are formed can be selected as desired.

As shown in FIGS. 2 and 3, the printing wiring board 2 positioned with respect to the rear frame 1 is attached with a space between the printing wiring board 2 and the rear of the rear frame 1 by threading the screws 3. The screws 3 are inserted through screw insertion holes 2a at the corners of the printing wiring board 2, and threaded into the screw holes 1f in the support protuberances 1a.

Second Embodiment

Referring now to FIG. 6 to 9, a liquid crystal module in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

The support protuberances 1a and the small protrusions 1g are not limited to the shapes discussed above, and can have any of various shapes (a truncated pyramid shape, a truncated circular cone shape, etc). At least one of the support protuberances 1a (the upper left support protuberance 1a shown in FIG. 2, for example) can be replaced with a support protuberance 10a shown in FIGS. 6 to 8. The support protuberance 10a has a circular shape in plan view (substantially a truncated circular cone shape). The support protuberance 10a has a flat upper face 10e at the top of the support protuberance 10a. The upper face 10e has a screw hole 10f formed in the upper face 10e. A first small protrusion 10g and a second small protrusion 10h are integrally formed on the support protuberance 10a. Specifically, the first and second small protrusion 10g and 10h and the support protuberance 10a are integrally formed as a one-piece unitary member. The first small protrusion 10g positions the printing wiring board 2 in one direction (upward in FIG. 6). The first small protrusion 10g has a rising face (e.g., first positioning face) facing vertically downward. The rising face abuts the printing wiring board 2. The second small protrusion 10h positions the printing wiring board 2 perpendicular to the one direction (to the left in FIG. 6). The second small protrusion 10h has a rising face (e.g., second positioning face) facing right. The rising face abuts the printing wiring board 2. The first and second small protrusions 10g and 10h are integrally formed into a substantially L shape as a one-piece unitary member. The first and second small protrusions 10g and 10h are formed taller than the upper face 10e of the support protuberance 10a by at least the thickness of the printing wiring board 2.

Figure 9:
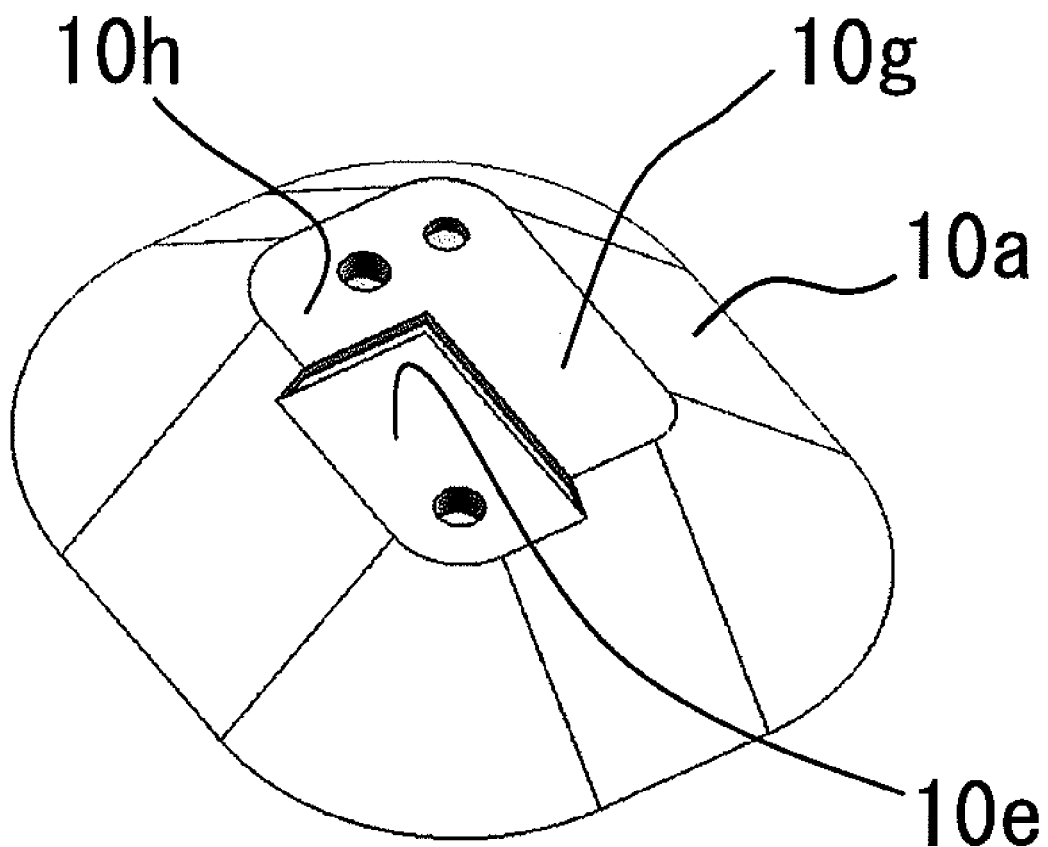
FIG. 9 is a partial perspective view of another rear frame of the liquid crystal module in accordance with the second embodiment of the present invention.

The support protuberances 10a and the first and second small protrusions 10g and 10h are formed integrally by drawing. The drawing is performed without making an L-shaped cut at the boundary between the upper face 10e and the first and second small protrusions 10g and 10h. Thus, no opening is formed in the rising face of the small protrusions 10g and 10h that faces the upper face 10e. Therefore, there is no light leakage whatsoever. The first and second small protrusions 10g can be formed by drawing with making an L-shaped cut at the boundary between the upper face 10e and the first and second small protrusions 10g and 10h as shown in FIG. 9. In this case, opening is formed between the first and second small protrusions 10g and 10h and the upper face 10e. However, the height of the first and second small protrusions 10g and 10h is no more than slightly greater than the thickness of the printing wiring board 2. Thus, there is almost no light leakage from the opening.

When the first and second small protrusions 10g and 10h are formed on the support protuberance 10a, positioning can be performed in two directions at the same time by placing the corner of the printing wiring board 2 on the upper face 10e of the support protuberance 10a and pressing the end faces of the corner against the first and second small protrusions 10g and 10h. Thus, the positioning work can be made even easier. When the upper left support protuberance 1a shown in FIG. 2 is replaced with the support protuberance 10a, it is preferable to form the small protrusion 1g on at least one of the upper right support protuberance 1a and the lower left support protuberance 1a to accurately position the printing wiring board 2.

Also, the first and second small protrusions 10g and 10h can be formed separately from each other on the support protuberance 10a. However, drawing is easier if both types of the first and second small protrusions 10g and 10h are formed integrally.

The liquid crystal module is installed into a television set, a personal computer, or another electronic device.

With the liquid crystal module, the small protrusions 1g, 10g and 10h for positioning the printed wiring board 2 are formed on the support protuberances 1a and 10a of the rear frame 1. Thus, there is no need to form the conventional lift-up tabs for positioning. Therefore, less openings are formed in the rear frame 1, and light leakage can be reduced. Furthermore, the small protrusions 1g, 10g and 10h formed integrally with the support protuberances 1a and 10a are strong and resistant to deformation. Thus, the printed wiring board 2 can be positioned more accurately than when the positioning is done with the conventional lift-up tabs.

The small protrusions 1g, 10g and 10h do not necessarily have to be formed on all of the support protuberances 1a and 10a, and can be formed on the support protuberances 1a and 10a located at places suited to positioning the printed wiring board 2.

With the liquid crystal module, the upper faces 1e and 10e are formed in a flat face, and the small protrusions 1g, 10g and 10h are formed taller than the upper face 1e and 10e by at least the thickness T of the printed wiring board 2. Thus, during positioning, the end edges of the printed wiring board 2 are less likely to slip away from the small protrusions 1g, 10g and 10h. As a result, the end edges of the printed wiring board 2 can be stably placed on the upper faces 1e and 10e of the flat support protuberances 1a and 10a. Thus, the positioning work becomes easier.

Furthermore, with the liquid crystal module, the first small protrusion 10g for positioning the printed wiring board 2 in one direction and the second small protrusion 10h for positioning the printed wiring board perpendicular to the one direction are formed on the support protuberance 10a of the rear frame 1. The corner of the printed wiring board 2 are placed on the support protuberance 10a and the end faces of the corner of the printed wiring board 2 are pressed against the first and second small protrusions 10g and 10h to position the printed wiring board 2 in two directions at the same time. Thus, the positioning work is facilitated even more. The first and second small protrusions 10g and 10h can be formed separately from each other on the support protuberances 10a, but drawing will be easier if both types of the first and second small protrusions 10g and 10h are formed integrally.

General Interpretation of Terms

In understanding the scope of the present invention, the term "comprising" and its derivatives, as used herein, are intended to be open ended terms that specify the presence of the stated features, elements, components and groups, but do not exclude the presence of other unstated features, elements, components and groups. The foregoing also applies to words having similar meanings such as the terms, "including", "having" and their derivatives. Also, the terms "part," "section," "portion," "member" or "element" when used in the singular can have the dual meaning of a single part or a plurality of parts. As used herein to describe the present invention, the following directional terms "forward, rearward, above, downward, vertical, horizontal, below and transverse" as well as any other similar directional terms refer to those directions of a liquid crystal module equipped with the present invention. Accordingly, these terms, as utilized to describe the present invention should be interpreted relative to a liquid crystal module equipped with the present invention as used in the normal operating position.

While selected embodiments have been chosen to illustrate the present invention, it will be apparent to those skilled in the art from these disclosures that various changes and modifications can be made herein without departing from the scope of the invention as defined in the appended claims. Furthermore, the foregoing descriptions of the selected embodiments according to the present invention are provided for illustration only, and not for the purpose of limiting the invention as defined by the appended claims and their equivalents.

What is claimed is:

1. A liquid crystal module comprising:
   a liquid crystal panel;
   a printed wiring board;
   a rear frame supporting the liquid crystal panel;
   a plurality of protrusion portions protruding from a rear face of the rear frame and fixedly supporting the printed wiring board on upper faces of the protrusion portions, the protrusion portions having a side surface with a continuous periphery connecting the rear face of the rear frame with the upper faces of the protrusion portions, respectively; and
      first and second positioning portions further protruding from at least one of the protrusion portions, the first positioning portion positioning the printed wiring board in a first direction, the second positioning portion positioning the printed wiring board in a second direction perpendicular to the first direction,
   a cold cathode tube disposed inside of the rear frame and configured to emit light to illuminate the liquid crystal panel,
   the protrusion portions having side surfaces that prevent the light from leaking between the rear frame and the printed wiring board.

2. The liquid crystal module according to claim 1, wherein the first positioning portion is integrally formed on one of the protrusion portions as a one-piece unitary member, and
   the second positioning portion is integrally formed on another one of the protrusion portions as a one-piece unitary member.

3. The liquid crystal module according to claim 1, wherein the first and second positioning portions are integrally formed on one of the protrusion portions as a one-piece unitary member.

4. The liquid crystal module according to claim 3, wherein the first and second positioning portions include first and second positioning faces, the first positioning face abutting the printed wiring board in the first direction, the second positioning face abutting the printed wiring board in the second direction.

5. The liquid crystal module according to claim 1, wherein the protrusion portions are integrally formed with the rear frame as a one-piece unitary member.

6. A liquid crystal module comprising:
   a liquid crystal panel;
   a printed wiring board;
   a rear frame supporting the liquid crystal panel;
   a plurality of protrusion portions protruding from a rear face of the rear frame and fixedly supporting the printed wiring board on upper faces of the protrusion portions with each of the upper faces of the protrusion portions being formed as a flat face, the protrusion portions having a side surface with a continuous periphery connecting the rear face of the rear frame with the upper faces of the protrusion portions, respectively; and
   first and second positioning portions further protruding from at least one of the protrusion portions, the first positioning portion positioning the printed wiring board in a first direction, the second positioning portion positioning the printed wiring board in a second direction perpendicular to the first direction, the first and second positioning portions being formed protruding from the upper faces of the protrusion portions by at least the thickness of the printed wiring board.

7. The liquid crystal module according to claim 6, wherein the first positioning portion is integrally formed on one of the protrusion portions as a one-piece unitary member, and
   the second positioning portion is integrally formed on another one of the protrusion portions as a one-piece unitary member.

8. The liquid crystal module according to claim 7, wherein the first positioning portion includes a first positioning face abutting the printed wiring board in the first direction, and
   the second positioning portion includes a second positioning face abutting the printed wiring board in the second direction.

9. The liquid crystal module according to claim 6, wherein the protrusion portions are integrally formed with the rear frame as a one-piece unitary member.

10. The liquid crystal module according to claim 6, further comprising
   a cold cathode tube disposed inside of the rear frame and configured to emit light to illuminate the liquid crystal panel,
   the protrusion portions having side surfaces that prevent the light from leaking between the rear frame and the printed wiring board.

* * * * *